UNITED STATES PATENT OFFICE.

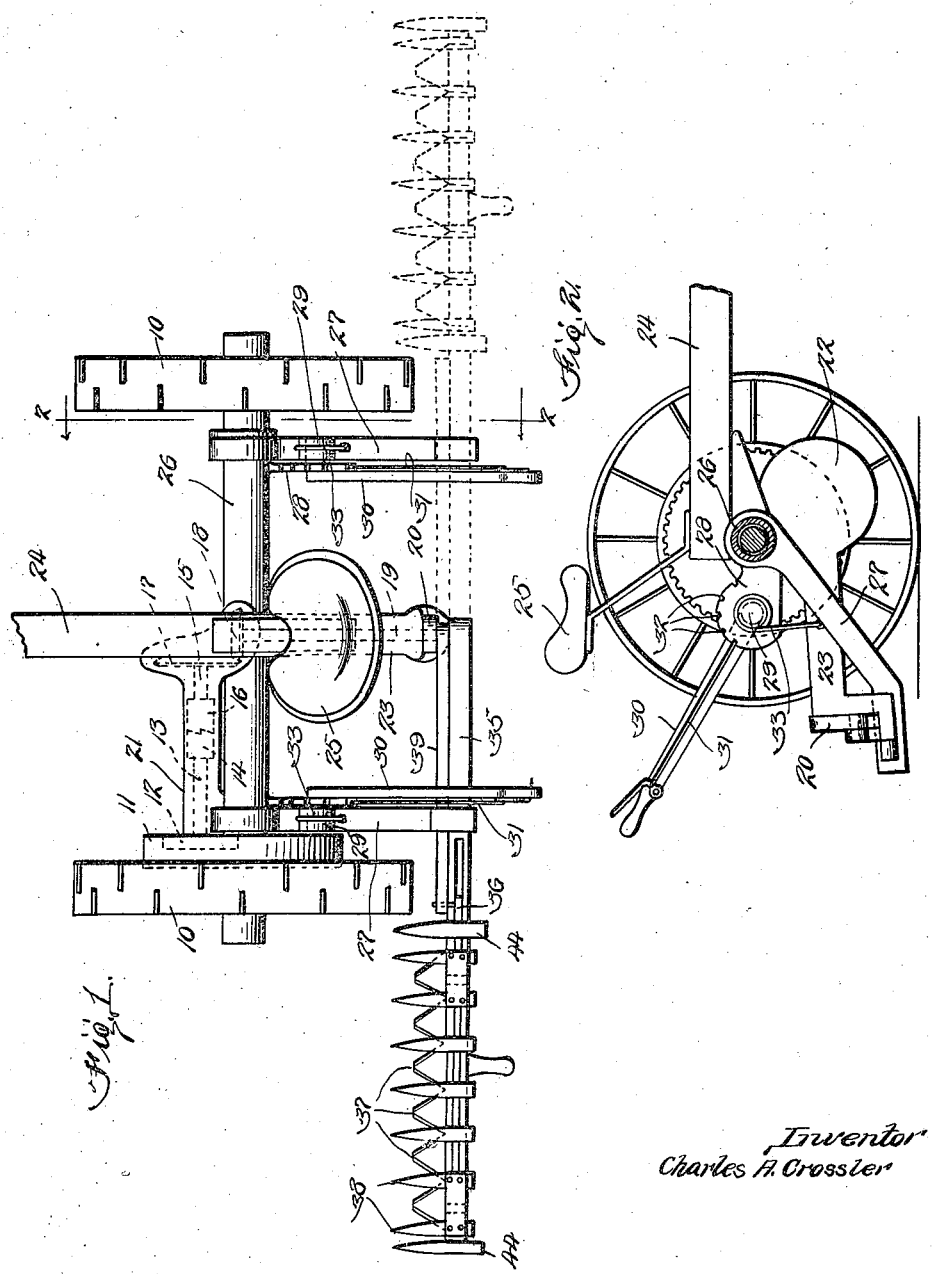

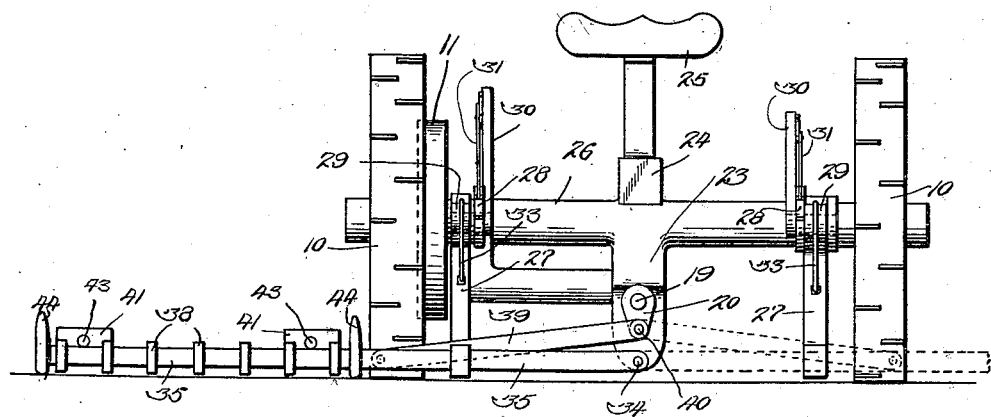

CHARLES A. CROSSLER, OF DAYTON, WASHINGTON.

SIDEHILL-MOWING MACHINE.

1,426,464.　　　　　　　Specification of Letters Patent.　　Patented Aug. 22, 1922.

Application filed May 7, 1921.　Serial No. 467,767.

*To all whom it may concern:*

Be it known that I, CHARLES A. CROSSLER, a citizen of the United States, residing at Dayton, in the county of Columbia and State of Washington, have invented certain new and useful Improvements in Sidehill-Mowing Machines, of which the following is a specification, reference being had to the accompanying drawings.

This invention relates to mowing machines, and particularly to that class of mowing machines wherein the sickle bar or finger bar and the sickle are shiftable to project on one side of the machine or on the other side of the machine and are adapted to be raised or lowered at different angles to permit the machine to operate on a side hill.

The general object of my invention is to provide a construction of this character so formed that by its means a cut can be made on one side of a field and then the sickle bar thrown over and the machine cut backward along the same side.

A further object is to provide very simple means for supporting the sickle bar or finger bar and the sickle, and provide simple means whereby the sickle may be reciprocated, and provide effective and simple means whereby the sickle bar and sickle may be raised or lowered to any desired angle.

Another object is to provide a sickle bar with rollers which will hold the knife bar or sickle down upon the ledger plate of the sickle bar.

Other objects will appear in the course of the following description.

My invention is illustrated in the accompanying drawings, wherein:—

Figure 1 is a plan view of a mowing machine constructed in accordance with my invention;

Figure 2 is a section on the line 2—2 of Figure 1;

Figure 3 is a rear elevation of the construction shown in Figure 1;

Figure 4 is a top plan view of the finger bar, the cutter bar and the cutting knives;

Figure 5 is a rear elevation of the construction shown in Figure 4;

Figure 6 is a section on line 6—6 of Fig. 4.

In these drawings, I have illustrated generally speaking a mowing machine of an ordinary type. The frame of this machine may be of any suitable construction and the frame is supported by means of two drive wheels or traction wheels 10. One of these traction wheels carries upon it an annular internal gear 11 adapted to mesh with a gear 12 mounted upon one end of a shaft 13 which carries a clutch member 14 at its inner end. Also operatively supported upon the frame of the machine is a transversely extending shaft section 15 carrying a coacting clutch member 16. These clutch members are in engagement with each other but are of such character that when the machine is backed, the clutch members will disengage and permit the machine to back without reciprocating the sickle or knives. Any means of this character may be used.

The shaft section 15 carries upon it a bevelled gear wheel 17 which engages a bevelled gear wheel 18 carried upon a rearwardly extending shaft 19. This shaft upon its rear end carries a crank or equivalent member 20. The shaft sections 13 and 15 are mounted within a housing 21 and the gears 17 and 18 are also enclosed within a housing 22. The housing 23 encloses the rearwardly extending shaft 19. The frame is provided with the usual tongue 24 and seat 25. The axle housing 26 carries upon it a pair of rearwardly and downwardly extending arms 27, these arms having head portions which surround the housing 26 so that the arms are oscillatable upon the housing as a center. The housing 26 has attached to it or formed with it the rearwardly extending, sector-shaped racks and supporting plate 28 supporting the shafts or oscillatable drums 29, and mounted upon these drum shafts are the levers 30 having manually releasable latches 31 adapted to engage with the notches 32 in the sector-shaped plates 28. Attached to each drum is a flexible connection 33 which extends downward and engages the corresponding arm 27. Thus it will be obvious that by shifting one of the levers 30 in one direction or the other, the corresponding arm 27 will be raised or lowered.

Pivotally mounted upon a pin 34 or other suitable pivotal connection extending from the lower end of the housing 23 or from any other part of the frame of the machine is a finger bar 35, and reciprocating upon this finger bar 35 is the knife bar 36 provided with the usual knives 37. The finger bar is provided with the usual fingers 38, through the slots of which the knives reciprocate. The knife bar is operatively connected at one end to a pitman 39, which is in turn pivoted to the wrist pin 40 of the crank 20. The fingers 38 are so formed as to be reversible when the finger bar is reversed, as illustrated in Figure 6, and caps 41 are provided adapted to rest upon the normally upper faces of the pair of finger bars and to be attached thereto by screws or other means 42, and in these caps are mounted the rollers 43 which rest upon the adjacent faces of the knives 37 so as to hold the knives against the finger bar. The finger bar is provided at one or more points with shoes 44 which project above and below the finger bar.

The finger bars should be of exactly the same shape on both top and bottom so that the cutting mechanism may be reversed, and when the finger bar is turned over the sickle bar or cutter bar is held in place by the four rollers. These four rollers resiliently bear against the cutter bar because of the fact that they are held in place by the projecting portion of the finger under which the roller is located, which is somewhat resilient, and the finger may be tightened up to force the rollers more strongly against the finger bar by the removal of the washers and nuts and by drawing the rear end of the fingers down by tightening the nuts which hold the rear ends of the fingers. It will be understood, of course, that the shoe or shoes should be the same form on top and bottom and of sufficient height to carry the sickle clear into the ground.

In operation, it is obvious that the finger bar and the pitman 39 may be turned from the full line position shown in Figure 1 to the dotted line position shown in Figure 1 so that the cutters may operate either on one side of the machine or on the other side of the machine, as desired. It will be also obvious that by operating one or the other of the levers 30, the cutter bar and finger bar may be raised into an angular relation to a horizontal plane and may be held in any desired angular adjustment, while by operating the proper lever 30 and reversely moving the drum 29, the finger bar may be quickly lowered into a less angle to the horizontal or into a horizontal plane itself. It will be seen that the arms 27 are angularly bent at their outer ends and engage beneath and support the finger bar.

While I have illustrated a particular construction of the frame of the mowing machine and a particular manner of driving the cutter bar from the drive wheel of the machine, I do not wish to be limited to this, as this might be changed in many ways without departing from the spirit of the invention.

I claim:—

1. In a mowing machine, a finger bar pivotally supported at one end upon the frame of the machine at the middle of the machine and being thereby adapted to be shifted through an angle of 180° from one side of the machine to the other, a cutter bar reciprocable upon the finger bar and movable therewith, the finger bar being provided with fingers having opposed ground engaging faces between which the cutter bar reciprocates, rollers carried upon the finger bar and bearing upon the cutter bar, and shoes mounted upon the finger bar and projecting above and below the finger bar whereby to engage the ground in either position of the finger bar.

2. In a mowing machine, a supporting frame, a drive wheel, a crank shaft, means operatively connecting the drive wheel to the crank shaft, said crank shaft being disposed in the axial center of the machine, a crank carried upon the rear of the crank shaft, a finger bar pivotally supported upon the frame of the machine at one end immediately below the crank shaft and the crank whereby the finger bar may be turned to project on one side of the machine or the other side of the machine, said finger bar having fingers formed with oppositely disposed, ground engaging faces, shoes mounted upon the finger bar and adapted to support it from the ground, a cutter bar having cutters and mounted upon the finger bar, and a pitman operatively pivoted to the inner end of the cutter bar and to said crank.

3. In a mowing machine, a supporting frame, driving wheels mounted thereon, a longitudinally extending shaft disposed in the axial center of the frame and extending rearward and provided with a crank, means operatively engaging one of said drive wheels with said shaft to drive it, a finger bar pivotally connected at one end to the frame of the machine in line with but below the crank shaft whereby the finger bar may be directed outward from one side or the other of the machine, a pair of drums rotatably mounted upon the frame of the machine on each side of the center thereof, a pair of arms oscillatably mounted upon the frame of the machine and extending rearward therefrom beneath the plane of rotation or oscillation of the finger bar, levers connected to said drums, flexible connections wound upon the drums and engaging said arms, means for locking the levers in any adjusted position, a cutter bar reciprocatably mounted upon the finger bar, and a pitman operatively connecting the cutter bar to the crank.

In testimony whereof I hereunto affix my signature.

CHARLES A. CROSSLER.